US010296458B2

United States Patent
Toliver et al.

(10) Patent No.: US 10,296,458 B2
(45) Date of Patent: May 21, 2019

(54) MULTI-LEVEL CACHE SYSTEM IN A SOFTWARE APPLICATION

(71) Applicant: Dell Products L.P., Round Rock, TX (US)

(72) Inventors: Zachary S. Toliver, Austin, TX (US); Luis E. Bocaletti, Chicago, IL (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 15/610,525

(22) Filed: May 31, 2017

(65) Prior Publication Data

US 2018/0349276 A1    Dec. 6, 2018

(51) Int. Cl.
*G06F 12/0811*    (2016.01)
*G06F 12/0813*    (2016.01)

(52) U.S. Cl.
CPC ...... *G06F 12/0811* (2013.01); *G06F 12/0813* (2013.01); *G06F 2212/60* (2013.01); *G06F 2212/62* (2013.01)

(58) Field of Classification Search
CPC ... G06F 12/08; G06F 12/0811; G06F 12/0813
See application file for complete search history.

(56) References Cited

U.S. PATENT DOCUMENTS

| | | | | |
|---|---|---|---|---|
| 5,361,391 A * | 11/1994 | Westberg | ............ | G06F 12/0862 711/137 |
| 5,875,462 A * | 2/1999 | Bauman | ............... | G06F 12/0811 711/117 |
| 6,029,175 A * | 2/2000 | Chow | ............... | G06F 17/30899 |
| 6,256,708 B1 * | 7/2001 | Watanabe | ........... | G06F 12/0888 711/122 |
| 6,851,010 B1 * | 2/2005 | Rao | ..................... | G06F 9/30047 711/118 |
| 7,124,249 B1 * | 10/2006 | Darcy | ................. | G06F 12/0864 711/122 |
| 8,171,114 B1 * | 5/2012 | Dale | ................... | H04L 67/2842 709/217 |
| 9,348,752 B1 * | 5/2016 | Parakh | ............... | G06F 12/0802 |
| 10,176,057 B2 * | 1/2019 | Parakh | ............... | G06F 11/1469 |
| 2002/0062384 A1 * | 5/2002 | Tso | ................... | G06F 17/30902 709/229 |
| 2002/0133570 A1 * | 9/2002 | Michel | .............. | G06F 17/30902 709/219 |

(Continued)

OTHER PUBLICATIONS

Ceze et al, University of Washington, Department of Computer Science and Engineering, Caches (Year: 2007).*

(Continued)

*Primary Examiner* — Midys Rojas
*Assistant Examiner* — Khoa D Doan
(74) *Attorney, Agent, or Firm* — Terrile, Cannatti & Chambers; Stephen A. Terrile (57) ABSTRACT

A system, method, and computer-readable medium are disclosed for performing a multi-level application cache operation, comprising: defining a first application level cache; defining an intermediate second application level cache; communicating with a last memory level, the last memory level including a source for a plurality of data objects; and, accessing a data object via the first application level cache when the data object is present and valid within the first application level cache.

12 Claims, 8 Drawing Sheets

(56) References Cited

U.S. PATENT DOCUMENTS

| | | | | |
|---|---|---|---|---|
| 2003/0172236 | A1* | 9/2003 | Iyengar | G06F 12/0811 711/145 |
| 2003/0208658 | A1* | 11/2003 | Magoshi | G06F 12/0811 711/122 |
| 2008/0022049 | A1* | 1/2008 | Hughes | G06F 12/084 711/130 |
| 2008/0028150 | A1* | 1/2008 | Toussi | G06F 12/0862 711/122 |
| 2008/0133836 | A1* | 6/2008 | Magid | G06F 12/0871 711/122 |
| 2009/0006755 | A1* | 1/2009 | Illikkal | G06F 11/3409 711/126 |
| 2009/0119454 | A1* | 5/2009 | Brooks | H04N 19/61 711/118 |
| 2010/0169469 | A1* | 7/2010 | Malladi | H04L 29/06319 709/223 |
| 2010/0179973 | A1* | 7/2010 | Carruzzo | G06F 17/30017 707/827 |
| 2010/0281216 | A1* | 11/2010 | Patel | G06F 12/121 711/118 |
| 2011/0107033 | A1* | 5/2011 | Grigoriev | G06F 12/0842 711/129 |
| 2011/0161548 | A1* | 6/2011 | Flachs | G06F 12/0864 711/3 |
| 2012/0131265 | A1* | 5/2012 | Koltsidas | G06F 12/0868 711/103 |
| 2012/0210068 | A1* | 8/2012 | Joshi | G06F 9/45558 711/122 |
| 2013/0013729 | A1* | 1/2013 | Bennett | H04L 67/2842 709/217 |
| 2013/0054897 | A1* | 2/2013 | Flemming | G06F 12/0888 711/122 |
| 2014/0355955 | A1* | 12/2014 | Berger | H04L 67/20 386/248 |
| 2015/0010143 | A1* | 1/2015 | Yang | G09C 1/00 380/28 |
| 2015/0113091 | A1* | 4/2015 | Thiyam | G06F 12/0815 709/214 |
| 2017/0264702 | A1* | 9/2017 | Dao | H04L 49/901 |

OTHER PUBLICATIONS

REDIS.IO, https://redis.io/, printed May 21, 2018.
memcached.org, A Distributed Memory Object Caching System, https://memcached.org/, printed May 21, 2018.

* cited by examiner

MULTI-LEVEL CACHE SYSTEM IN A SOFTWARE APPLICATION

BACKGROUND OF THE INVENTION

Field of the Invention

The present invention relates to information handling systems. More specifically, embodiments of the invention relate to executing a software application which includes a multi-level cache system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to user information handling systems to execute applications which perform external service calls to gather information for the application may require from that service. An issue can arise when many service calls are required, the external service is lacking in performance, or when the external service is not responding. If any of these cases are met, then the end user may run into hindrances in the experience.

SUMMARY OF THE INVENTION

A system, method, and computer-readable medium are disclosed for performing a multi-level application cache operation comprising: defining a first application level cache; defining an intermediate application level cache; communicating with a last memory level, the last memory level including a source for a plurality of data objects; and, accessing a data object via the first application level cache when the data object is present and valid within the first application level cache.

In various embodiments, the multi-level application cache operation provides a way to define multiple providers that work fluidly to enhance reliability and scalability of information. In certain embodiments, the multi-level application cache operation preemptively updates a cache object in the background based upon a cache update value. In certain embodiments, the cache update value includes an update service level agreement (SLA) value. Such a multi-level application cache operation enhances a customer experience by reducing the need for run-time calls to a source before a user is presented with information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include a recognition that challenge facing many development teams in the information technology (IT) industry is the large number of service calls that sometimes perform poorly, or in some cases can cripple the application when the service load is high. Issues relating to the large number of service calls can cause a cascading effect where a client application is negatively affected by the degraded performance of the service or API that is being called.

Various aspects of the disclosure include an appreciation that a system that uses a memory cache will generally perform better than a system that does not assuming that cache objects are in memory. However, with limited storage available to a memory cache, a downside of using a memory cache can potentially mean that more calls to source systems may need to occur.

Various aspects of the disclosure include an appreciation that a system that takes advantage of a persistent cache repository will generally also perform better than a system which needs to always access a source system. Although using a persistent cache repository may be slightly slower than using memory cache, the persistent cache repository provides a large (relative to a memory cache) amount of storage thus reducing the overall load on source systems since the persistent cache repository can hold more information.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
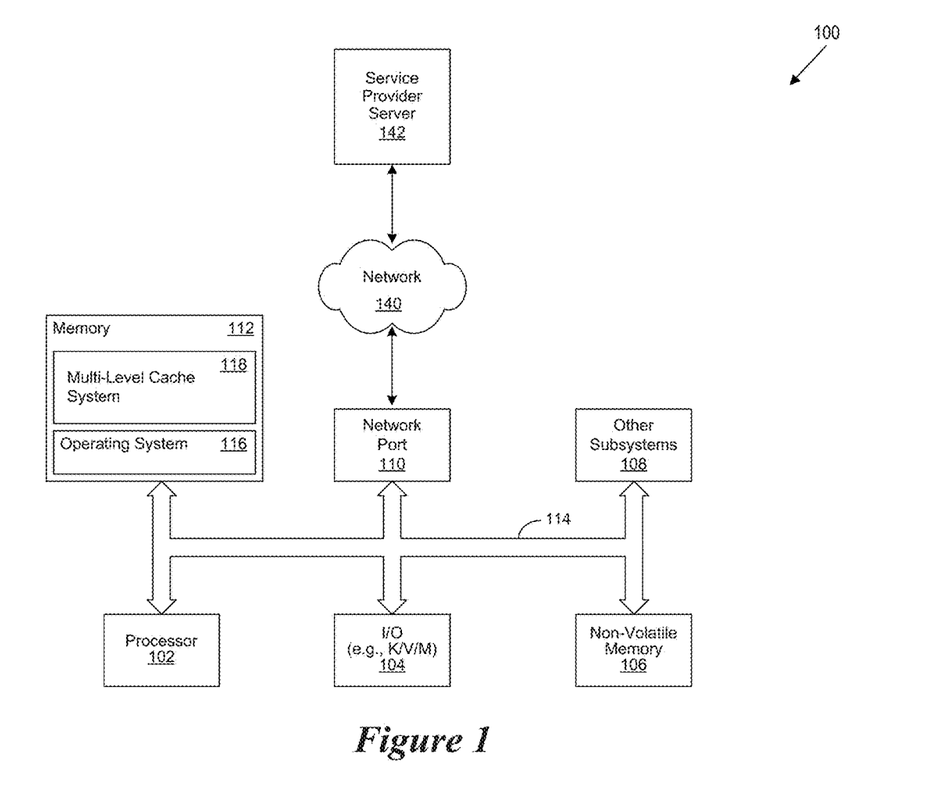
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise multi-tier application cache system 118.

The multi-tier application cache system 118 performs a multi-tier application cache operation. The multi-tier application cache operation improves processor efficiency (and thus the efficiency of the information handling system 100) by improving the efficiency of accessing information from within an application.

As will be appreciated, once the information handling system 100 is configured to perform the multi-tier application cache operation, the information handling system 100 becomes a specialized computing device specifically configured to perform the multi-tier application cache operation and is not a general purpose computing device. Moreover, the implementation of the multi-tier application cache operation on the information handling system 100 improves the functionality of the information handling system and provides a useful and concrete result of reducing the time for obtaining information from a remote memory location.

In various embodiments, the multi-level software cache operation provides an extensible solution that integrates multiple cache providers with different capabilities to gain the advantages of the capabilities of each type of cache. Providing a multi-level cache system that integrates these or other types of cache providers, enables applications to take advantage of the best of each type of cache provider.

An additional advantage of such a multi-level cache system is present when updated information is necessary after the information has been semi-permanently stored in a database system or source of information. In these cases, the multi-level cache system allows development teams to make less frequent calls to external services to retrieve refreshed information while update existing cache objects with the new data retrieved from the service response object. For the purposes of this disclosure, a service may be defined as software functionality (or a set of software functionalities) that can be reused by different clients for different purposes, together with the policies that control usage of the functionality. Examples of software functionality include retrieval of specified information and execution of a set of operations.

Figure 2:
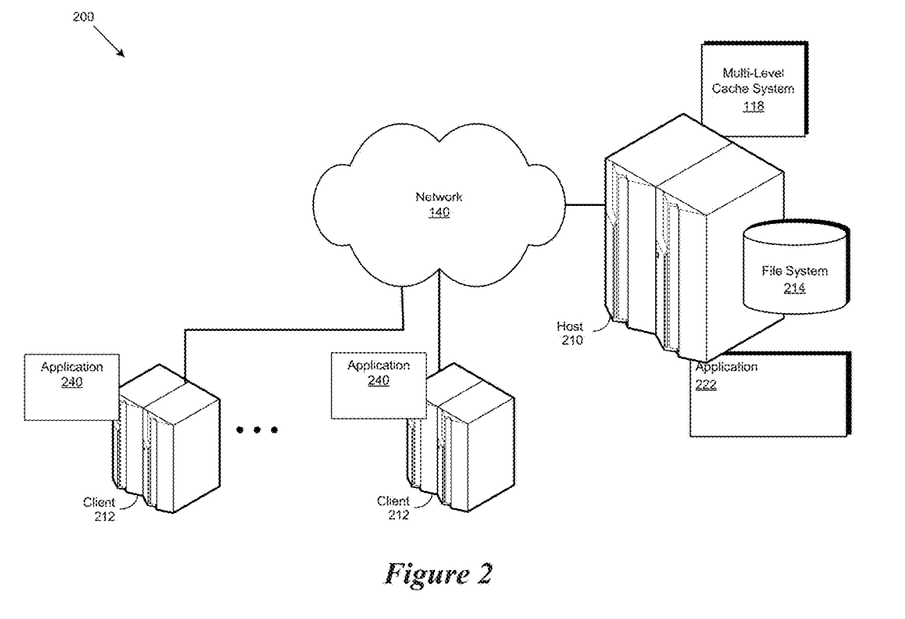
FIG. 2 shows a simplified block diagram of multi-level software cache environment.

FIG. 2 shows a simplified block diagram of multi-level software cache environment 200. In various embodiments, the multi-level software cache environment 200 includes a host system 210 and at least one client system 212. The host system 210 executes the multi-level software cache system 118 on a hardware processor. In certain embodiments, the multi-level software cache system 118 includes a multi-level software cache. The host system 210 may also execute an application 222 on a hardware processor. It will be appreciated that the host system 210 and each client system 212 may be respective information handling systems. Each client system 212 includes an application 240 executing on a hardware processor. In various embodiments, the multi-level cache system 118 may be coupled to a plurality of cache providers, where each of the plurality of cache providers provides one or more levels of a multi-level cache. In various embodiments, the cache providers can be in memory local to the host system 210 as well as another shared memory, file system, etc.

In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the multi-level application cache system 118 includes capabilities to retrieve, store, update, and remove cache objects from any number of levels in the multi-level cache system. In various embodiments, the multi-level application cache system 118 combines or integrates caches from any number of cache providers. For example, by combining providers a memory cache and a persistent cache repository cache, the application gains performance (when retrieving items from the memory provider), puts low load on a source system (by rarely requiring access to it) and has virtually unlimited extendable storage as an option. For the purposes of this disclosure, virtually unlimited indicates that the storage space for each cache level can be extended by increasing an amount of memory in the cache provider itself or by adding new nodes to elastic search. The method by which each cache level's storage can be extended can vary based upon the technology used within the cache provider.

Figure 3:
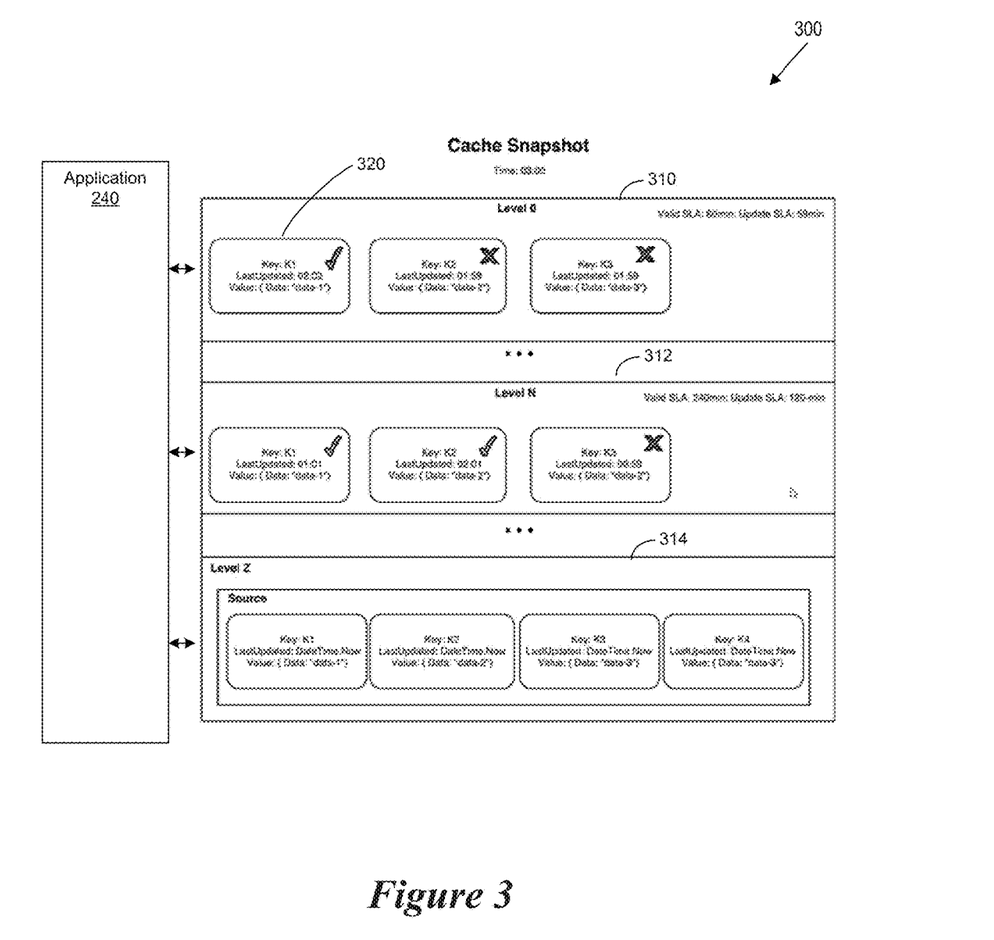
FIG. 3 shows a block diagram of a multi-level application cache architecture.

Referring to FIG. 3, a block diagram of a multi-level application cache architecture 300 is shown. In various embodiments, multi-level application cache architecture 300 is integrated with existing applications to provide a multi-level application cache system that can store, retrieve, update, and remove cache objects from any level within the multi-level cache system. As requests from client systems 212 arrive to the multi-level cache system 118, the multi-level cache system 118 performs a hierarchical search for the item in all the cache levels. If the item is located in a level and it's found to be valid, then that item is returned to the client. If the item is not located, then a call is made to the source external service. The results of the call to the source external services is used to populate the cache levels and to send a response to the client system 212.

In various embodiments, the multi-level application cache architecture 300 includes a plurality of storage levels. In various embodiments, at least some of the plurality of storage levels comprise application cache levels provided via a cache provider. For the purposes of this disclosure, an application cache level may be defined as a level of storage that includes an assigned provider, an update value and a valid trigger value. For the purposes of this disclosure, a cache provider may be defined as a system which provides cache functionality. In certain embodiments, the cache functionality includes a GetValue function, a GetValues function, a SetValue function and a RemoveValue function. For the purposes of this disclosure, a cache may be defined as a temporary storage repository, whether local or remote, which is designed to enhance the speed of retrieving information stored within the repository.

In various embodiments, the plurality of storage levels include first cache level 310 (Level 0), intermediate cache level 312 (Level N) and a last memory level 314 (Level Z). In certain embodiments, the last level 314 is a wrapper around a source system to make it appear like intermediate cache level. In certain embodiments, the first cache level 310 and the intermediate cache level 312 reside locally with respect to a system executing an application 240. In certain embodiments, the first cache level 310 and the intermediate cache level 312 are integrated with the application 240. In certain embodiments, the first cache level 310 is accessed directly by the application 240. In certain embodiments, the first cache level 310 corresponds to application memory storage. In certain embodiments, the application 240 accesses the intermediate cache level 312 via an enterprise search engine such as the Elasticsearch search engine. In certain embodiments, the last memory level 314 is semi-permanent and resides remotely with respect to the system executing the application 240. In certain embodiments, the last memory level 314 is included within the file system 214 associated with the host system 210. In certain embodiments the application 240 accesses the last memory level 314 via a service call. In various embodiments, the last memory level 314 is the ultimate source for each data object used by the application 240. In various embodiments, the plurality of storage levels are in addition to and function independently of any cache levels directly controlled by the hardware processor.

In various embodiments, the multi-level application cache system 118 includes a software process that provides the multi-level cache architecture with 'n' levels where a cache object 320 is stored in object storage within a particular level. Each cache object 320 includes a reference key (key), update information (LastUpdated) and a data value (Value). A cache object 210 is referenced via a key. When the key is present, the multi-level cache architecture returns the cache object In certain embodiments, a cache object may be valid, as indicated by a checkmark, or invalid, as indicated by an "x." Upon finding an invalid item in a level. The system calls the next level to obtain a "fresh" value to update the current level. If the item in the next level is invalid, the process repeats until a valid item is found (which in the worst case scenario will involve calling the external service). When making a call to a source system to retrieve cacheable information, upon retrieval of a null, empty or invalid response, the multi-level cache system removes the cache object from the current cache level.

Use of caching response objects from external services enables application development teams to focus on application performance, reliability and improving the customer experience. Such a multi-level application cache system 118 provides a user of the application 240 with a cost saving due to the reduction in time spent making service calls to external services.

The multi-level application cache system 118 tracks a plurality of first cache values having associated first cache level cache values and a plurality of intermediate cache level cache having associated intermediate cache level cache values. More specifically, the plurality of first cache level cache values includes a first valid value and a first update value. A valid value represents an amount of time that an item in an associated level is considered valid or fresh. After that time, the item is considered invalid or stale. An update value is always less than the valid value and represents the amount of time an item must be in cache before a preemptive update is triggered. A cache item has an updated timestamp. The timestamp is used to determine whether an item is still valid (if the duration value has not already elapsed) or whether the item needs to be preemptively updated (if the update value has already elapsed). For example, if a valid value for the memory cache is one hour, each object that was cached more than one hour ago is considered invalid since it has now expired. The update value defines when the multi-level cache system can use the value from the retrieved cache, but will update the cached information in the background by calling the next cache level. In certain embodiments, the first valid value includes a first valid service level agreement value and the first update value includes a first update service level agreement value. More specifically, the plurality of intermediate cache level values includes an intermediate valid value and an intermediate update value. In certain embodiments, the intermediate valid value includes an intermediate valid service level agreement value and the intermediate update value includes an intermediate update service level agreement value. For the purposes of this disclosure, a valid service level agreement value is a service level agreement value that determines the amount of time that a cache item is considered valid in a particular cache level. For the purposes of this disclosure, an update service level agreement value is a service level agreement value that determines the amount of time that an item must be in a cache before a background update is triggered.

In one example, with information served up quicker through a multi-level cache system integrated with an application such as a unified search application, the application experiences on average over a 91% cache usage rate. Accordingly, with the example, calls to external services were only necessary 8-9% of the time a user interacts with the application. Thus, the multi-level application cache operation serves the data to the application quicker and reduces the load on the external services.

The optimal case where multi-level cache performs best is when cached data is retrieved from the best performing cache level. With the multi-level application cache architecture 300, the best performing cache level is the first cache level 310. For the purposes of this disclosure, cache freshness is the length of time a cache object has been stored in the cache level relative to the expiry time. The higher the cache level, the slower the cache level performs but the fresher the cached data is. In one example, the application 240 obtains information from the first level cache 310 in 0-20 milliseconds, from the intermediate level cache in 10-100 milliseconds and from the last memory level in 300 or more milliseconds.

Figure 4:
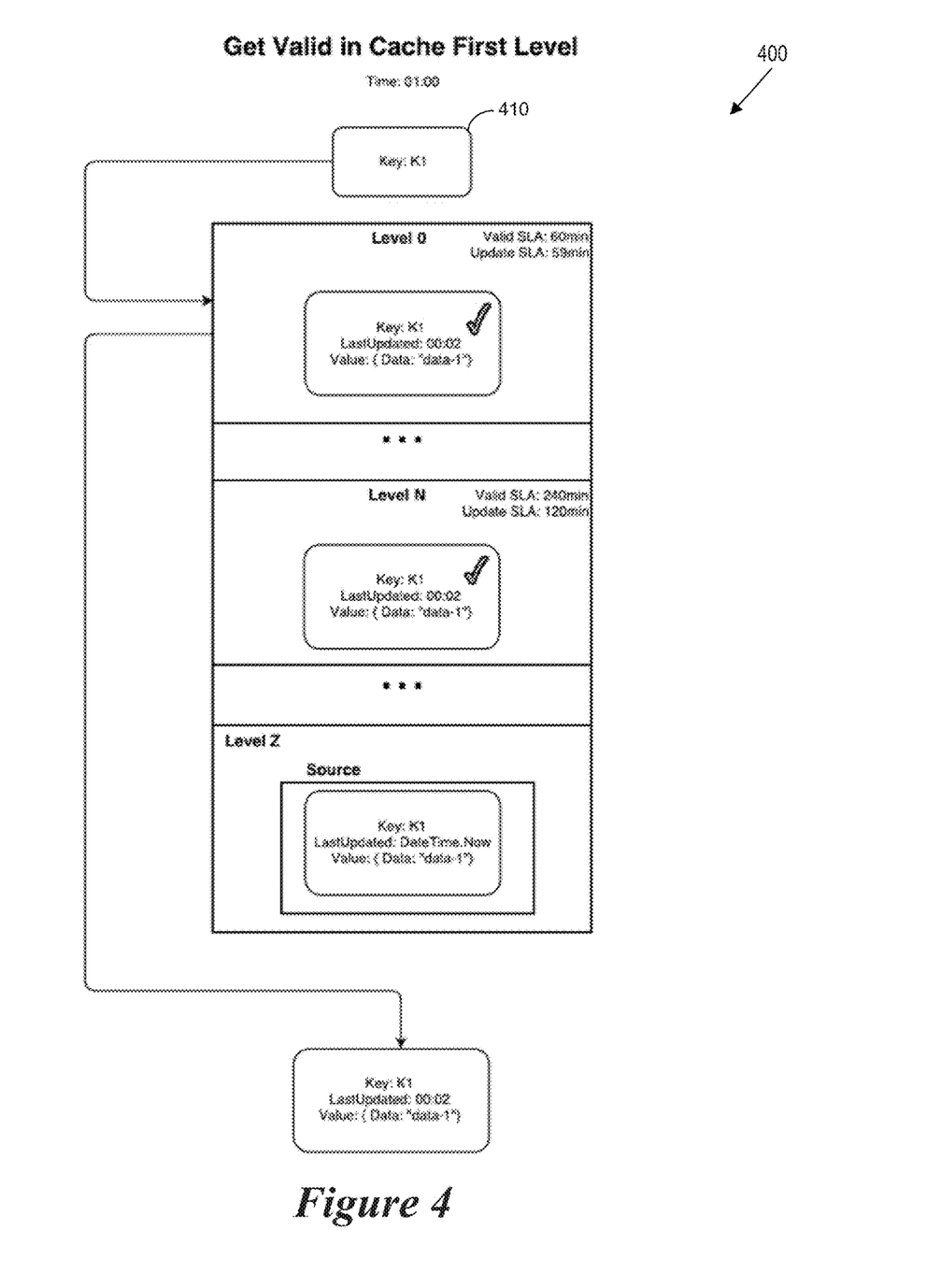
FIG. 4 shows a block diagram of a multi-level application cache operation when a valid cache object is stored within the first level cache and the intermediate level cache, but retrieved from the first level as the item has not yet expired.

A block diagram of a multi-level application cache operation when a valid cache object is stored within the first level cache 310 is shown in FIG. 4. For the purposes of this disclosure, a valid cache object is a cache item whose expiration time has not passed and an invalid cache object is a cache item whose expiration time has already passed. With this example, the object associated with key K1 is present and valid at each memory level. When the application requests information (such as Service Level Agreement (SLA) information) by generating the key 410 associated with the information. For the purposes of this disclosure a service level agreement may be defined as an amount of time that a cache object is valid for use, i.e., SLA information is a date time value that defines the expiration of a cache object within a given cache level. If a cache item is outside of a valid SLA, the multi-tier application cache operation takes action to ensure that the cache is updated or the item is removed to reflect the latest information. This key 410 is provided to the first level cache 310. Because the object associated with the key is present in the first level cache 310 and valid, the object is provided to the application 240 from the first level cache, significantly improving the response time of the application with respect to the information contained in the object. Because the object associated with the key is present in the first level cache 310 and valid, the proceeding levels are then ignored and the data is returned from the first level.

Figure 5:
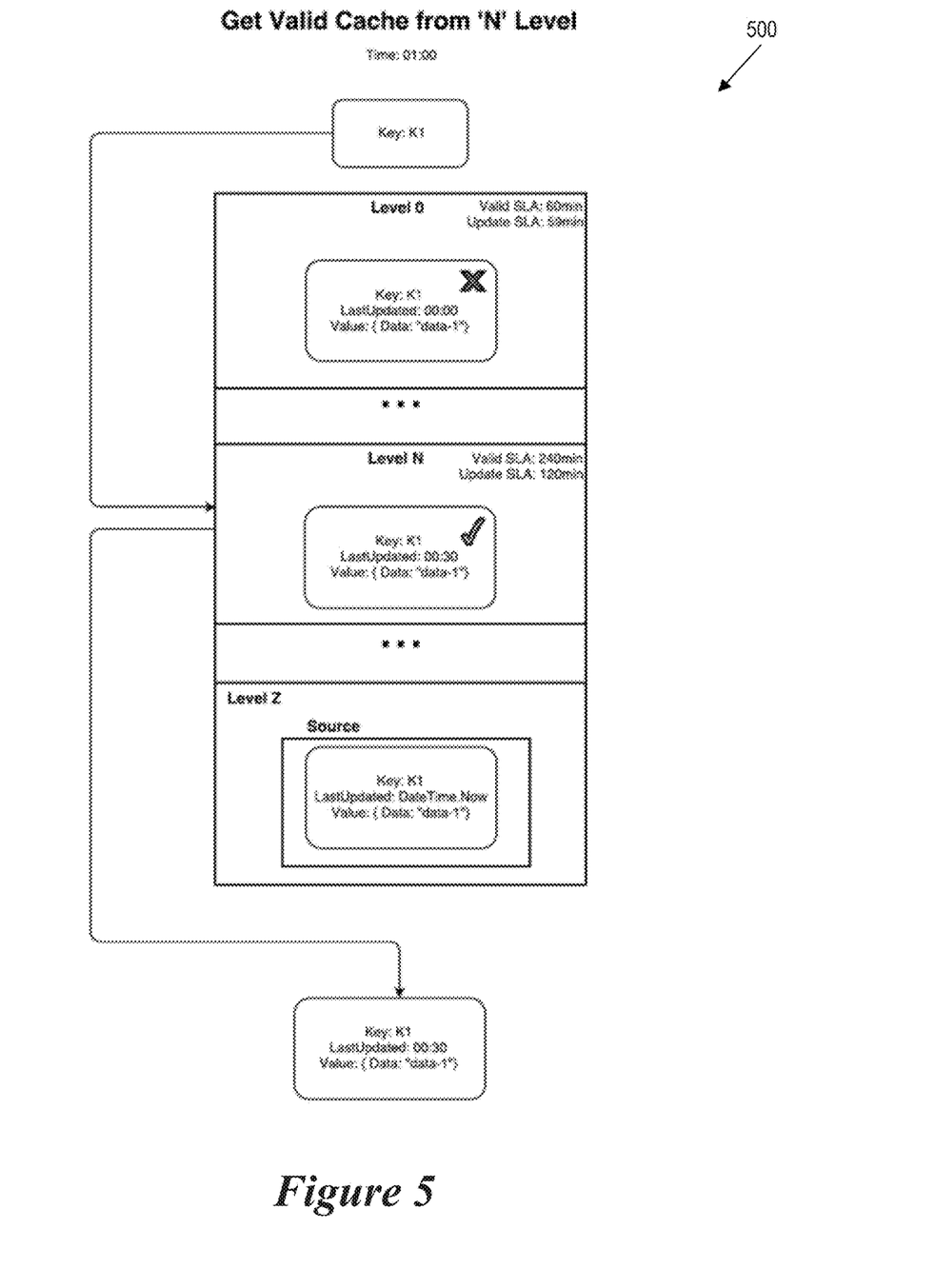
FIG. 5 shows a block diagram of a multi-level application cache operation when an invalid cache object is stored within the first level cache and is retrieved from the intermediate level as the first level cache object has expired.

A block diagram of a multi-level application cache operation when an invalid cache object is stored within the first level cache 310 is shown in FIG. 5. With this example, the object associated with key K1 is present but the version stored within the first level cache is invalid, but the version stored within the intermediate level cache is valid. For example, the first level cache object is invalid because the LastUpdated property value is "00:00." The valid SLA for this cache level is 60 minutes. If the current time is 1:00 or after, then the cache object is considered invalid since it is now expired. For example, the valid time for the intermediate cache level is 240 minutes. If the current time is 01:00, then the object in this cache level will remain valid until 04:00. After that, updated cache information will be retrieved from the source and then recursively updated in the other cache levels. The version of the object that is stored in the last memory level 314 is always valid as this is the source of the object. When the application requests information by generating the key 410 associated with the information. This key 410 bypasses the first level cache 310 and is provided to the intermediate level cache 312. Because the object associated with the key is present in the intermediate level cache 312 and valid, the object is provided to the application 240 from the intermediate level cache 312, significantly improving the response time of the application with respect to the information contained in the object. Because the object associated with the key is present in the intermediate level cache 310 and valid, the proceeding levels are then ignored and the data is returned from the intermediate level.

Figure 6:
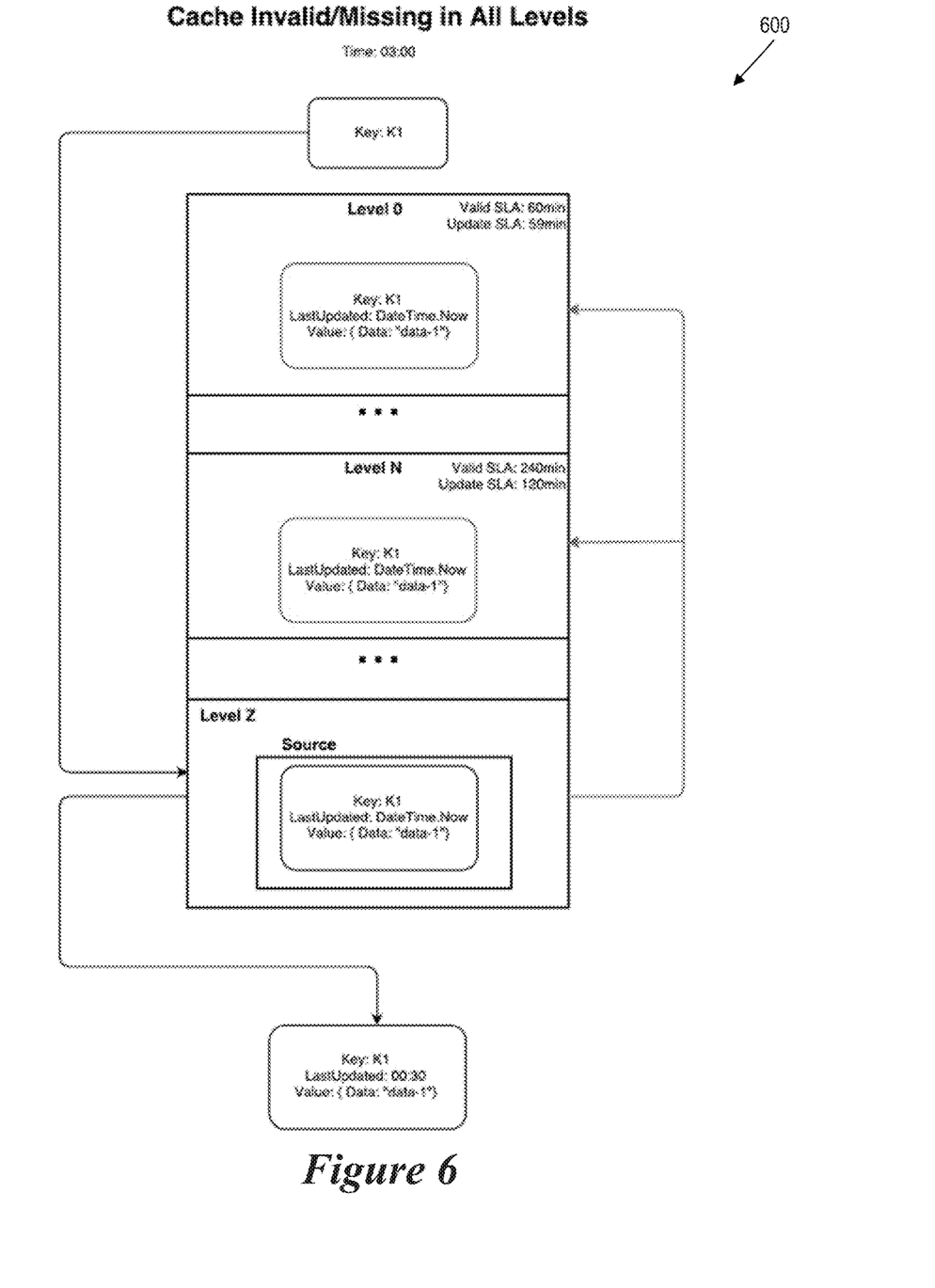
FIG. 6 shows a block diagram of a multi-level application cache operation when an invalid or missing cache object is stored within the all cache levels.

A block diagram of a multi-level application cache operation when an invalid or missing cache object is stored within the first level cache 310 and the intermediate level cache 312 is shown in FIG. 6. With this example, the object associated with key K1 is not present within the first level cache 310. Additionally, the object associated with key K1 is not present in the intermediate level cache 312. The version of the object that is stored in the last memory level 314 is valid as this is the source of the object. When the application requests information by generating the key 410 associated with the information, the multi-level application cache system 118 determines that the object is not present in the first level cache 310 and is not present in the intermediate level cache 312. Thus the key 410 bypasses the first level cache 310 and the intermediate level cache 312 and is provided to the last memory level 314 (i.e., the source of the object). Once the value is retrieved from the source, the source value is returned to the application 240. The source value is also stored and/or updated in all lower cache levels.

Figure 7:
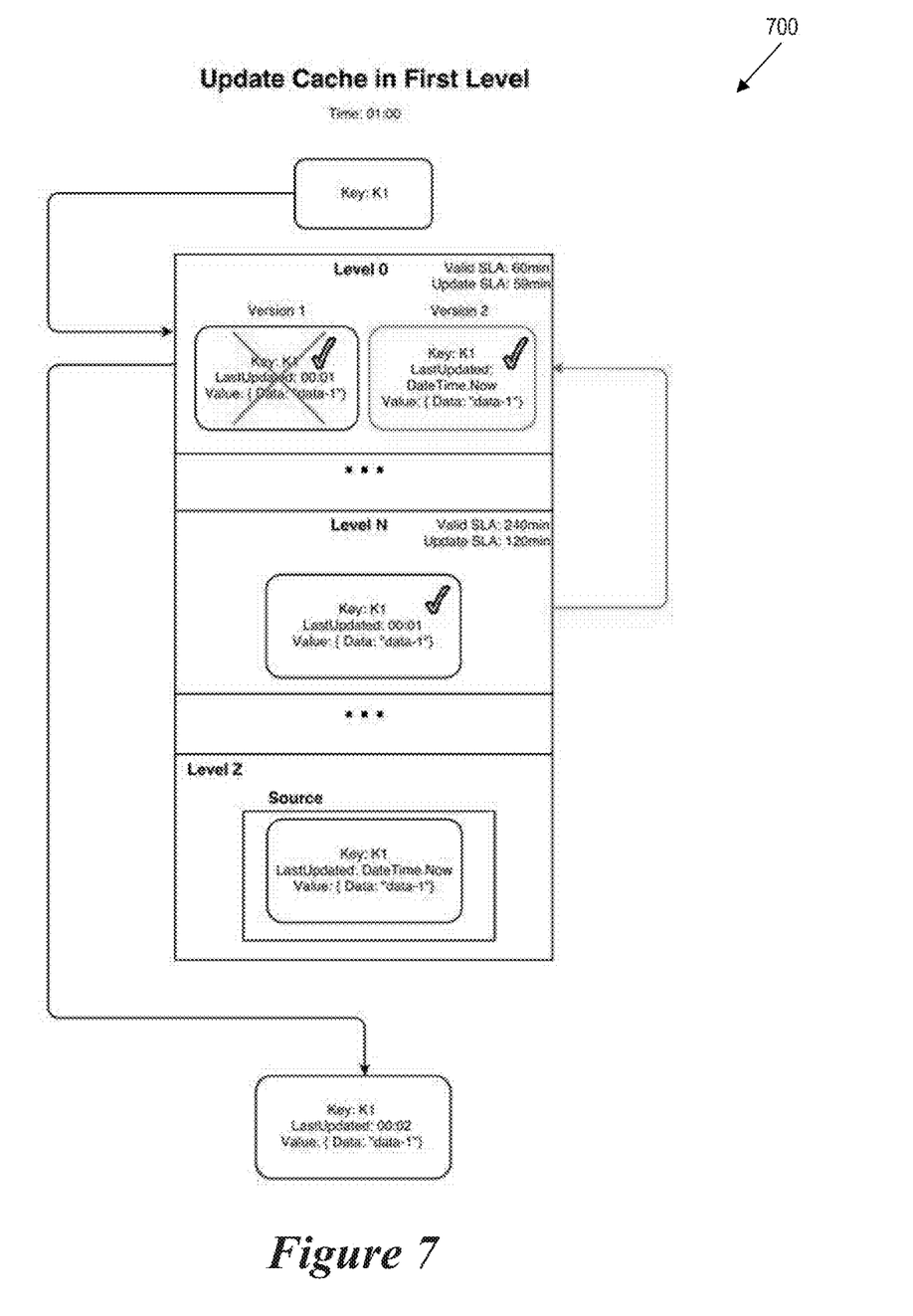
FIG. 7 shows a block diagram of a multi-level application cache operation when an invalid object is stored within the first level cache and is within an update value.

A block diagram of a multi-level application cache operation when an invalid object is stored within the first level cache 310 is shown in FIG. 7. With this example, the object associated with key K1 is present within the first level cache 310, but there is a more recent version of this object stored in the remote level 314. More specifically, the object associated with key K1 is within the first update value, but not the valid update time value. Thus, the value associated with key K1 stored within the first level cache 310 is returned from the cache item, but an update request to the source is generated. This update request causes the source to preemptively update the first level cache 310 in the background so that the next cache request is ready to pull an updated cache item from the first level cache 310. When a cache object is retrieved and deemed to be within the update value, the system triggers an event to retrieve updated and fresh cache information from the next level and update the current level. The current cached values are returned to the user thus preventing the user from waiting for updated cache information while the new values are set in the background. Thus, the background does not block the user of the system for obtaining the object. Additionally, a valid object associated with key K1 is present within the level cache 312; this valid object is used to update the first cache level. When the application requests information by generating the key 410 associated with the information, the multi-level application cache system determines that the object is out of date (i.e., there is a more recent version of the object at the source) in the first level cache 310. Because the object is out of date, there is no need for the application to attempt to retrieve the information from the second level cache 312. The source value is used to update the object stored in the first level cache 310 and the object stored in the second level cache 312.

Referring again to FIG. 3, the multi-level application cache operation implement caching for a service or API, by providing a request class that has all parameters needed to build the service call and a response class. Both classes implement a public interface (IHasKey). The public interface IHasKey provides a logical point at which the application interacts. The multi-level application cache operation also creates data provider(s) that accept request(s) and return a response to be stored, retrieved, updated, or removed in cache. The cache values are referenced with the 'Key' string field which is equivalent in both the request and response item objects thus both classes implement IHasKey to inherit the Key property.

More specifically, the detailed implementation and usages are shown as: public interface IHasKey {string Key {get;}}}

The request object is set forth as:

```
public class SnpPriceRequest : IHasKey
{
    public string Sku { get; set; }
    public string Segment { get; set; }
    public string Key => $"SnpPrice_{Segment}_{Sku}";
}
```

The response object is set forth as:

```
public class SnpPriceItem : IHasKey
{
    public decimal ListPrice { get; set; }
```

-continued

```
    public decimal SalePrice { get; set; }
    public decimal TotalDiscount { get; set; }
    public Lwp Profile { get; set; }
    public string Sku { get; set; }
    public DateTime LastUpdated { get; set; }
    public string Key => $"SnpPrice_{Profile.Segment}_{Sku}";
}
```

After the request and response objects have been created, the multi-level application cache operation creates one or more providers to retrieve information from the cache. These providers implement the IProvider interface. In this interface, a provider is where the multi-level application cache operation adds code to retrieve a response object from a service or API call.
public class SnpPriceProvider: IProvider<SnpPriceRequest, SnpPricItem>

This interface contains two methods "Get" which will either take a single cache request and "List" which will take a collection of cache requests.

TValue Get(SpPriceRequest request) and List<TValue> Get(List<SnpPriceRlequest> requests);

The multi-level application cache operation also declares cache providers. public class SnpPriceProvide<SnpPriceRequest, SnpPriceItem>: ICacheProvider<SnpPriceRequest, SnpPriceItem> where TRequest:IHasKey where TValue:IHasKey var provider1=new SnpPriceProvider<SnpPriceRequest, SnpPriceItem>(config)

The multi-level application cache operation also declares cache levels. Each cache level must be initialized with a provider, an update SLA value, and a valid SLA value. Cache levels are declared statically, but the multi-level application cache operation traverses through the levels recursively at run-time to retrieve valid cache objects. var level1=new CacheLevel<SnpPriceRequest, SnpPriceItem>{Provider=provider1, UpdateSla=59.Minutes( ), ValidSla=1.Hours( )}; var level2=new CacheLevel<SnpPriceRequest, SnpPriceItem>{Provider=provider2, UpdateSla=240.Minutes( ), ValidSla=120.Minutes};

The multi-level application cache operation also create a new instance of multilevel cache by passing level and level2 as cache levels. In this case, the multi-level application cache operation sets OverrideCache to false. This allows cache validation checks to be overwritten given a certain condition.
var multi=new MulitiLevlCache<SnpPriceRequest, SnpPriceItem>{CacheLevels=new[ ] (level1, level2). ToList( ), OverrideCache=(r, v)=>false};

The multi-level application cache operation also implements a cache request. In the class where the cache request is executed, a provider field should be declared. private readonly IProvider<SnpPiceRequest, SnpPriceItem>_provider;

The cache request is initialized to pass into the Get( ) method to retrieve cache information from any of the levels included in the provider. The cache key is built using required fields from this request. The key is used to reference the cache item in any cache level. If the cache key is found in a cache level and is valid, then the cache item is returned from that level. The following is an example of a cache request.

```
    var request = new SnpPriceRequest
    {
        Country = "us",
        Language = "en",
        Segment = "dhs",
        CustomerSet = "19",
        Region = "us",
        Sku = "A7207216",
        ProcessingTime = "2017-01-09T23:25:33Z"
    }
    var cacheReturned = _provider.Get(request);
```

Figure 8:
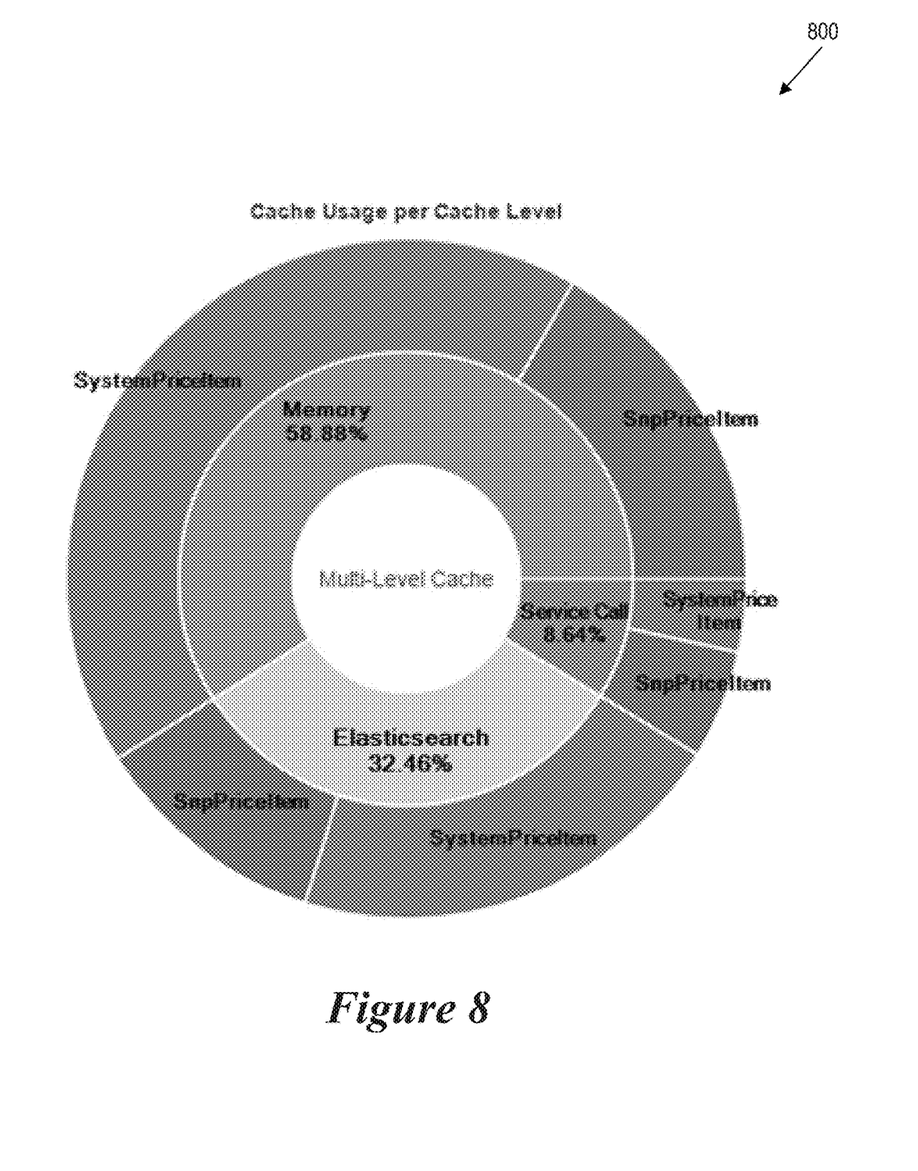
FIG. 8 shows a chart of a multi-level application cache operation having three memory levels with usage percentages of each level.

FIG. 8 shows a chart 800 of a multi-level application cache operation having three memory levels. The chart also shows the cache retrieval rate for each level along with the cache type retrieval rate within each level. As an example, the first cache level 310 (identified in the chart as Memory) is used ~58% of the time. Within that level, two large cache type usages become apparent, a "SnpPriceItem" and "SystemPriceItem." The intermediate cache level 312 (identified in the chart as Elasticsearch) is used ~32% of the time. Within that level, two large cache type usages become apparent, a "SnpPriceItem" and "SystemPriceItem." The intermediate cache level 312 (identified in the chart as Service Call) is used ~32% of the time. Within that level, two large cache type usages become apparent, a "SnpPriceItem" and "SystemPriceItem." From this chart it may be determined that the cache usages of the intermediate cache level and last memory level are progressively less than those of the first cache level. Such a chart enables a user to can gauge how often a cache is being used for each item which allows a user to determine how much of an impact the usage has on the overall system.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a multi-level application cache operation, comprising:
defining a first application level cache;
defining an intermediate application level cache;
communicating with a last memory level, the last memory level including a source for a plurality of data objects;
accessing a data object via the first application level cache when the data object is present and valid within the first application level cache; and
preemptively updating the data object after a trigger by a cache update value; and wherein
the cache update value comprises a plurality of first cache level values and a plurality of intermediate cache level values, the plurality of first cache level values comprising a first valid value and a first update value, the plurality of intermediate cache level values comprising an intermediate valid value and an intermediate update value.

2. The method of claim 1, wherein:
the preemptively updating occurs in the background of an application.

3. The method of claim 1, wherein:
the cache update value includes an update service level agreement (SLA) value.

4. The method of claim 1, wherein:
the first application level cache and the intermediate application level cache are in addition to and function independently of any cache levels directly controlled by a hardware processor.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
defining a first application level cache;
defining an intermediate application level cache;
communicating with a last memory level, the last memory level including a source for a plurality of data objects;
accessing a data object via the first application level cache when the data object is present and valid within the first application level cache; and,
preemptively updating the data object after a trigger by a cache update value; and wherein;
the cache update value comprises a plurality of first cache level values and a plurality of intermediate cache level values, the plurality of first cache level values comprising a first valid value and a first update value, the plurality of intermediate cache level values comprising an intermediate valid value and an intermediate update value.

6. The system of claim 5, wherein:
the preemptively updating occurs in the background of the application.

7. The system of claim 5, wherein:
the cache update value includes an update service level agreement (SLA) value.

8. The system of claim 5, wherein:
the first application level cache and the intermediate application level cache are in addition to and function independently of any cache levels directly controlled by a hardware processor.

9. A non-transitory, computer-readable storage medium embodying computer program code, the computer program code comprising computer executable instructions configured for:
defining a first application level cache;
defining an intermediate application level cache;

communicating with a last memory level, the last memory level including a source for a plurality of data objects;

accessing a data object via the first application level cache when the data object is present and valid within the first application level cache; and preemptively updating the data object after a trigger by a cache update value; and wherein the cache update value comprises a plurality of first cache level values and a plurality of intermediate cache level values, the plurality of first cache level values comprising a first valid value and a first update value, the plurality of intermediate cache level values comprising an intermediate valid value and an intermediate update value.

10. The non-transitory, computer-readable storage medium of claim 9, wherein:

the preemptively updating occurs in the background of the application.

11. The non-transitory, computer-readable storage medium of claim 9, wherein:

the cache update value includes an update service level agreement (SLA) value.

12. The non-transitory, computer-readable storage medium of claim 9, wherein:

the first application level cache and the intermediate application level cache are in addition to and function independently of any cache levels directly controlled by a hardware processor.

* * * * *